United States Patent
Jansen

(10) Patent No.: US 7,379,188 B2
(45) Date of Patent: May 27, 2008

(54) PHASE SHIFT INTERFEROMETER

(75) Inventor: Maarten Jansen, De Rijn (NL)

(73) Assignee: Mitutoyo Corporation, Kawasaki (JP)

( * ) Notice: Subject to any disclaimer, the term of this patent is extended or adjusted under 35 U.S.C. 154(b) by 155 days.

(21) Appl. No.: 11/487,430

(22) Filed: Jul. 17, 2006

(65) Prior Publication Data
US 2007/0019203 A1    Jan. 25, 2007

(30) Foreign Application Priority Data
Jul. 21, 2005    (JP) ............................ 2005-211292

(51) Int. Cl.
*G01B 9/02* (2006.01)
(52) U.S. Cl. ...................... 356/495; 356/511
(58) Field of Classification Search ................ 356/492, 356/395, 493, 498, 511
See application file for complete search history.

(56) References Cited
U.S. PATENT DOCUMENTS
2005/0270530 A1* 12/2005 Wada et al. ................ 356/364

FOREIGN PATENT DOCUMENTS
JP    11-337321 A    7/2005

* cited by examiner

*Primary Examiner*—Hwa S Lee (Andrew)
(74) *Attorney, Agent, or Firm*—Oliff & Berridge, PLC

(57) ABSTRACT

A phase shift interferometer (100) has an illuminating optical system (200) that emits a P-wave and an S-wave, a collimator lens (110), a reference half mirror (120), a pinhole plate (130) having a pinhole (131), and a phase shift interference fringe acquiring section (300) that allows an object light and a reference light contained in the light beam passed through the pinhole (131) interfere with each other in four different phases to acquire interference fringes with different phases. In the S-wave, only the reference light (SR) reflected by the reference half mirror (120) is passed through the pinhole (131), and the object light (SM) reflected by a surface-to-be-measured is blocked by the pinhole plate (130). In the P-wave, only the object light (PM) reflected by the surface-to-be-measured is passed through the pinhole (131), and the reference light (PR) reflected by the reference half mirror (120) is blocked by the pinhole plate (130).

5 Claims, 13 Drawing Sheets

PHASE SHIFT INTERFEROMETER

BACKGROUND OF THE INVENTION

1. Field of the Invention

The present invention relates to a phase shift interferometer. Particularly, the present invention relates to a Fizeau-type phase shift interferometer.

2. Description of Related Art

As a measuring device for measuring irregularity of a surface-to-be-measured, there has been known a phase shift interferometer, and particularly there has been known a Fizeau-type interferometer as shown in FIG. 13 for measuring irregularity of a wide surface (refer to, for example, Japanese Patent Laid-Open Publication No. Hei 11-337321).

The optical path of the Fizeau-type phase shift interferometer as shown in FIG. 13 will be described below.

As shown in FIG. 13, the light (L10) emitted from a light source 11 is brought to a parallel beam by a collimator lens system 12, passed through (L11) a half mirror 13, and incident on the surface of the workpiece.

The light (L10) emitted from the light source 11 is a linearly polarized light.

Herein a quarter wavelength plate 14, which also serves as a reference surface, is provided between the half mirror 13 and the workpiece.

A portion of the light (L11) incident on the quarter wavelength plate 14 from the light source 11 is reflected by the quarter wavelength plate 14, and the rest passes through the quarter wavelength plate 14.

The light (L12) reflected by the quarter wavelength plate 14 returns to the half mirror 13 as a reference light.

The light (L13) passed through the quarter wavelength plate 14 is irradiated on the surface of the workpiece, reflected by the surface of the workpiece as an object light (L14) to return to the quarter wavelength plate 14, and then passed through the quarter wavelength plate 14 to be incident on the half mirror 13.

At this time, since the object light (L14) from the surface of the workpiece passes through the quarter wavelength plate two times, the vibration direction thereof is rotated by 90°, and therefore the polarizing direction thereof is orthogonal to that of the reference light (L12).

Thus, as non-interfering light beam, the reference light (L12) and the object light (L14) return to the half mirror 13 through a common optical path without interfering with each other.

The non-interfering light beam returned to the half mirror 13 is reflected (L16) by the half mirror 13, then reflected by the reflecting mirror 15, and then passed through (L17) the quarter wavelength plate 16.

By passing through the quarter wavelength plate 16, the object light (L14) and the reference light (L12) contained in the non-interfering light beam are converted into circularly polarized lights having rotating directions opposite to each other.

The light (L17) passed through the quarter wavelength plate 16 is split into three light beams (L18, L19, L20) by a first half mirror 17, a second half mirror 18, and a reflecting mirror 19 provided in the optical path.

Polarizers 20, 21, 22 and CCD cameras 23, 24, 25 are respectively provided in the optical paths of the split light beams (L18, L19, L20).

Herein the first polarizer 20 provided in the optical path of the first light beam (L18) reflected by the first half mirror 17, the second polarizer 21 provided in the optical path of the second light beam (L19) reflected by the second half mirror 18, and the third polarizer 22 provided in the optical path of the third light beam (L20) reflected by the third half mirror 19 respectively have transmission axis angles different from each other.

For example, the first polarizer 20 has a transmission axis angle of 0°, the second polarizer 21 has a transmission axis angle of 45°, and the third polarizer 22 has a transmission axis angle of 90°.

Thus three interference fringes having phases different from each other by 90° are imaged by the respective CCD cameras.

Further, the images of the interference fringes are input to a predetermined analyzing section, and phase information of the surface of the workpiece can be acquired by comparing image strengths in each point among the three interference fringes.

Thus the surface shape of the workpiece can be measured.

In such an arrangement, with the Fizeau-type phase shift interferometer, though the surface shape of the workpiece can be measured in a wide range by emitting a wide parallel light beam into the surface of the workpiece, there is a problem that the structure is actually impracticable.

With the above arrangement, in order to multiplex the object light and the reference light without interfering with each other, the quarter wavelength plate 14 is disposed in the optical path, and the object light passes through the quarter wavelength plate 14 two times so that the object light and the reference light become polarized lights orthogonal to each other. However, to produce a quarter wavelength plate 14 with a large opening is actually very difficult.

In other words, since a wavelength plate is a flat plate obtained by cutting a double refraction crystal in a predetermined direction, it is very difficult to obtain a good quality wavelength plate with a wide opening, and the manufacturing cost will be extremely high.

Thus it is desired to provide a practicable Fizeau-type phase shift interferometer.

SUMMARY OF THE INVENTION

It is a primary object of the present invention to provide a Fizeau-type phase shift interferometer.

A phase shift interferometer according to an aspect of the present invention includes: an illuminating optical system for emitting a first polarized light and a second polarized light having polarizing directions orthogonal to each other or having rotating directions opposite to each other; a collimator lens positioned in an optical path between the illuminating optical system and a surface-to-be-measured; a reference half mirror positioned in the optical path between the collimator lens and the surface-to-be-measured for reflecting a portion of the first polarized light and the second polarized light while transmitting a portion of the first polarized light and the second polarized light toward the surface-to-be-measured; a pinhole plate provided with a pinhole located at a focus position of the collimator lens on the side opposite to the surface-to-be-measured; and a phase shift interference fringe acquiring section for making, in an object light reflected by the surface-to-be-measured and a reference light reflected by the reference half mirror, a portion of the object light and the reference light that have been passed through the pinhole interfere with each other in three or more different phases to obtain interference fringes with different phases; in which in the first polarized light, the reference light reflected by the reference half mirror is passed through the pinhole while the object light reflected by the surface-to-be-measured is blocked by the pinhole plate; and in the second polarized light, the object light reflected by the surface-to-be-measured is passed through the pinhole while the reference light reflected by the reference half mirror is blocked by the pinhole plate.

In such a configuration, the light emitted from the illuminating optical system is incident on the reference half mirror after passing through the collimator lens. The light incident on the reference half mirror is then split into a transmitted light and a reflected light, and the transmitted light is irradiated on the surface-to-be-measured. The light reflected by the reference half mirror is incident on the collimator lens as a reference light and then passed to the pinhole. The light reflected by the surface-to-be-measured is passed through the reference half mirror as an object light, then incident on the collimator lens, and then passed to the pinhole.

In other words, in the first polarized light, the reference light reflected by the reference half mirror and the object light reflected by the surface-to-be-measured are passed to the pinhole; and in the second polarized light, the reference light reflected by the reference half mirror and the object light reflected by the surface-to-be-measured are also passed to the pinhole.

In the first polarized light, only the reference light reflected by the reference half mirror is passed through the pinhole.

While in the second polarized light, only the object light reflected by the surface-to-be-measured is passed through the pinhole. In other words, as a reference light, only the first polarized light is passed through the pinhole; and as an object light, only the second polarized light is passed through the pinhole. Further, since the first polarized light and the second polarized light have polarizing directions orthogonal to each other or have rotating directions opposite to each other, the reference light of the first polarized light and the object light of the second polarized light pass through the pinhole as non-interfering light beams without interfering with each other.

The reference light of the first polarized light and the object light of the second polarized light passed through the pinhole as non-interfering light beams are then incident on the phase shift interference fringe acquiring section. The phase shift interference fringe acquiring section makes the non-interfering light beams passed through the pinhole interfere with each other in three or more different phases.

In other words, the phase shift interference fringe acquiring section makes the reference light of the first polarized light and the object light of the second polarized light interfere with each other in a plurality of different phases to acquire interference fringes with different phases. Further, the phase information of the surface-to-be-measured can be acquired from the interference fringes with different phases, so that the height of the surface-to-be-measured can be obtained.

With such a configuration, it is possible to achieve a Fizeau-type interferometer with which the light emitted from the illuminating optical system is converted to a wide light beam by the collimator lens, then the light beam is irradiated on the surface-to-be-measured, and then the object light having the phase information of the surface-to-be-measured interferes with the reference light to measure the shape of a surface-to-be-measured, and further, it is possible to achieve a Fizeau-type phase shift interferometer which allows the reference light of the first polarized light and the object light of the second polarized light to interfere with each other in a plurality of different phases to simultaneously acquire a plurality of interference fringes with different phases.

Conventionally, in a Fizeau-type phase shift interferometer, a quarter wavelength plate was suggested to be used in order to convert an object light and a reference light into non-interfering light beams, but it was very difficult to obtain a wavelength plate with a wide opening adapted to a wide light beam.

With the present invention however, since the first polarized light and the second polarized light, which do not interfere with each other from the beginning, are emitted from the illuminating optical system, it is not necessary to employ a wavelength plate for converting the object light and the reference light into non-interfering light beams.

Herein, since both the first polarized light and the second polarized light will be reflected by the reference half mirror as reference light and reflected by the surface-to-be-measured as object light, if all reflected lights are received by the phase shift interference fringe acquiring section, the reference light and the object light of the first polarized light will interfere with each other, and the same goes for the reference light and the object light of the second polarized light.

If the reference light and the object light of the respective polarized lights interfere with each other, the phase shift interference fringe acquiring section can not make the reference light and the object light interfere with each other in different phases to simultaneously acquire a plurality of interference fringes with different phases.

Here in the present invention, in the first polarized light, only the reference light reflected by the reference half mirror is allowed to pass through the pinhole so as to be incident on the phase shift interference fringe acquiring section; and in the second polarized light, only the object light reflected by the surface-to-be-measured is allowed to pass through the pinhole so as to be incident on the phase shift interference fringe acquiring section.

Since the light beams to be incident on the phase shift interference fringe acquiring section are selected by the pinhole in this manner, the reference light of the first polarized light and the object light of the second polarized light are incident on the phase shift interference fringe acquiring section as non-interfering light beams. Thus the phase shift interference fringe acquiring section can make the reference light and the object light interfere with each other in different phases to simultaneously acquire a plurality of interference fringes with different phases.

According to the present invention, since the present invention is a Fizeau-type interferometer, it is possible to measure the shape of the surface-to-be-measured with a wide light beam, and further, since it is possible to make the reference light and the object light interfere with each other in different phases to simultaneously acquire a plurality of interference fringes with different phases, measuring time can be shortened although being a phase shift interferometer. Further, since the wavelength plate (the quarter wavelength plate) for converting the reference light and the object light into the non-interfering light beams is unnecessary, a practicable configuration is possible to be configured.

In the phase shift interferometer according to the aspect of the present invention, it is preferred that the illuminating optical system emits the first polarized light and the second polarized light at positions separated by a predetermined interval; and the reference half mirror is tilted at a predetermined angle with respect to the optical axis of the collimator lens.

With such a configuration, if the first polarized light and the second polarized light are incident on the reference half mirror, both the first polarized light and the second polarized light will be reflected by the reference half mirror. Since the reference half mirror is tilted at a predetermined angle, the reference lights of the first polarized light and the second polarized light will be reflected toward the direction corresponding to the tilting angle of the reference half mirror. Further, since the first polarized light and the second polarized light are emitted at positions separated by a predetermined interval, when first polarized light and the second polarized light are passed through the collimator lens, the reference light of the first polarized light and the reference light of the second polarized light will be imaged by the collimator lens at positions different from each other. Further, when the first polarized light and the second polarized light are incident on the reference half mirror, a portion of the first polarized light and the second polarized light is passed through the reference half mirror to be emitted to the surface-to-be-measured. Further, the first polarized light and the second polarized light irradiated on the surface-to-be-measured are reflected by the surface-to-be-measured, and then the object light of the first polarized light and the object light of the second polarized light reflected by the surface-to-be-measured are passed through the collimator lens. Since the first polarized light and the second polarized light are emitted at positions separated by a predetermined interval, the object light of the first polarized light and the object light of the second polarized light will be imaged by the collimator lens at positions different from each other.

Herein the reference light of the first polarized light and the reference light of the second polarized light are reflected by the reference half mirror tilted at a predetermined angle, and the object light of the first polarized light and the object light of the second polarized light are reflected lights of the lights substantially perpendicularly irradiated on the surface-to-be-measured. Accordingly, all the reference light of the first polarized light, the reference light of the second polarized light, the object light of the first polarized light, and the object light of the second polarized light are imaged by the collimator lens at positions different from each other. Thus, by adjusting the position of the pinhole and the diameter of the pinhole, it is possible to only allow the reference light of the first polarized light and the object light of the second polarized light to pass through the pinhole.

As a result, the reference light of the first polarized light and the object light of the second polarized light can be incident on the phase shift interference fringe acquiring section as non-interfering light beams. Further, since the light beams to be incident on the phase shift interference fringe acquiring section can be selected only by emitting the first polarized light and the second polarized light at positions separated by a predetermined interval and adjusting tilting angle of the reference half mirror, the configuration can be simplified.

In the phase shift interferometer according to the aspect of the present invention, it is preferred that the illuminating optical system emits the first polarized light at a point off the optical axis of the collimator lens while emits the second polarized light along the optical axis of the collimator lens.

In such a configuration, when the first polarized light emitted from illuminating optical system is incident on the collimator lens, the first polarized light is emitted from the point off the optical axis of the collimator lens, therefore after passing through the collimator lens, the first polarized light is incident on the reference half mirror as a light beam tilted at a predetermined angle with respect to the optical axis of the collimator lens.

Since the reference half mirror is tilted at a predetermined angle, by processing a predetermined adjustment to the tilting angle of the reference half mirror, the reference light of the first polarized light is reflected by the reference half mirror along a direction parallel to the optical axis of the collimator lens. So that the reference light of the first polarized light is focused by the collimator lens at the position of the pinhole so as to pass through the pinhole.

On the other hand, in the first polarized light, the light passed through the reference half mirror is irradiated on the surface-to-be-measured at a predetermined angle. Thus the object light of the first polarized light is reflected by the surface-to-be-measured along a direction tilted at an angle with respect to the optical axis of the collimator lens. Since the pinhole is located at the focus position of the collimator lens, the object light of the first polarized light is imaged by the collimator lens at a position deviated from the pinhole, and therefore the object light of the first polarized light is blocked by the pinhole plate. Further, the second polarized light emitted from illuminating optical system is emitted from the point in the optical axis of the collimator lens, and converted into a parallel light beam parallel to the optical axis of the collimator lens by the collimator lens so as to be incident on the reference half mirror. Since the reference half mirror is tilted, in the second polarized light incident on the reference half mirror, the reference light reflected by the reference half mirror is reflected along a direction deviated from the optical axis of the collimator lens. Thus the reference light of the second polarized light reflected by the reference half mirror is imaged by the collimator lens at the position deviated from the pinhole, and therefore the reference light of the second polarized light is blocked by the pinhole plate.

On the other hand, in the second polarized light, the light passed through the reference half mirror is incident on the surface-to-be-measured and then reflected by the surface-to-be-measured as a light beam parallel to the optical axis of the collimator lens.

Thus the object light of the second polarized light is imaged by the collimator lens at the position of the pinhole, and therefore is passed through the pinhole.

With such a configuration, since the reference light of the first polarized light and the object light of the second polarized light to be passed through the pinhole are imaged at the focus position of the collimator lens, the pinhole can be positioned at the focus position of the collimator lens. Thus the assembling work of the interferometer, including position adjustment of the pinhole for example, can be simplified.

In the phase shift interferometer according to the aspect of the present invention, it is preferred that the phase shift interference fringe acquiring section includes: a quarter wavelength plate positioned in the optical path of the light passed through the pinhole; and three or more polarizers positioned in the optical path and having transmission axis angles different from each other.

With such a configuration, before the non-interfering light beams of the reference light of the first polarized light and the object light of the second polarized light interfere with each other by the phase shift interference fringe acquiring section so as to acquire a plurality of different interference fringes, the non-interfering light beams are incident on the quarter wavelength plate first. In the case where, for example, the first polarized light and the second polarized light are polarized lights having polarizing directions orthogonal to each other, by passing through the quarter wavelength plate, the reference light and the object light contained in the non-interfering light beams are converted into circularly polarized lights having rotating directions opposite to each other. Further, by passing the non-interfering light beams of the reference light and the object light through the polarizers having transmission axis angles different from each other, the reference light and the object light interfere with each other in different phases to simultaneously acquire a plurality of interference fringes. With such a configuration, since the phase of the interference fringe can be shifted by making the transmission axis angles of the polarizers different from each other, it is possible to simultaneously acquire a plurality of interference fringes with different phases.

Herein, to arrange the polarizers having transmission axis angles different from each other in the optical path, a composite polarizer formed by combining a plurality of polarizers, each having transmission axis angles different from each other, into one plate-like polarizer can be inserted in the light beam, so that the respective portions of the light beam are passed through the respective polarizer portions having transmission axis angles different from each other.

Alternatively, a plurality of different interference fringes also can be acquired by splitting the light beam into three or more beams with a half mirror or a prism, and then passing the respective beams through the polarizers having transmission axis angles different from each other to acquire a plurality of interference fringes with different phases.

In the phase shift interferometer according to the aspect of the present invention, it is preferred that the illuminating optical system has a laser light source, a polarizer for converting the light from the laser light source into the polarized lights, a half wavelength plate, and a beam splitter for splitting the light from the laser light source into the first polarized light and the second polarized light having the polarizing directions orthogonal to each other, and the main axis angle of the half wavelength plate can be adjusted relative to the main axis angle of the beam splitter by rotating the half wavelength plate.

In such a configuration, the half wavelength plate can be rotated so that the angle of the main axis of the half wavelength plate is adjusted. Thus the polarizing direction of the polarized light is rotated by a predetermined angle by the half wavelength plate, so that the polarizing direction of the polarized light is changed with respect to the optical axis of the beam splitter.

Thus the relative strength of the first polarized light and the second polarized light generated by splitting the light by the beam splitter can be adjusted. For example, when the workpiece to be measured has low reflectivity, there is possibility that the object light is too weak to acquire desirable interference fringe, however clear interference fringes can be acquired by adjusting the strength of the first polarized light and the second polarized light so that the object light reflected by the workpiece and the reference light reflected by the reference surface have substantially the same strength.

DETAILED DESCRIPTION OF PREFERRED EMBODIMENT(S)

Figure 1:
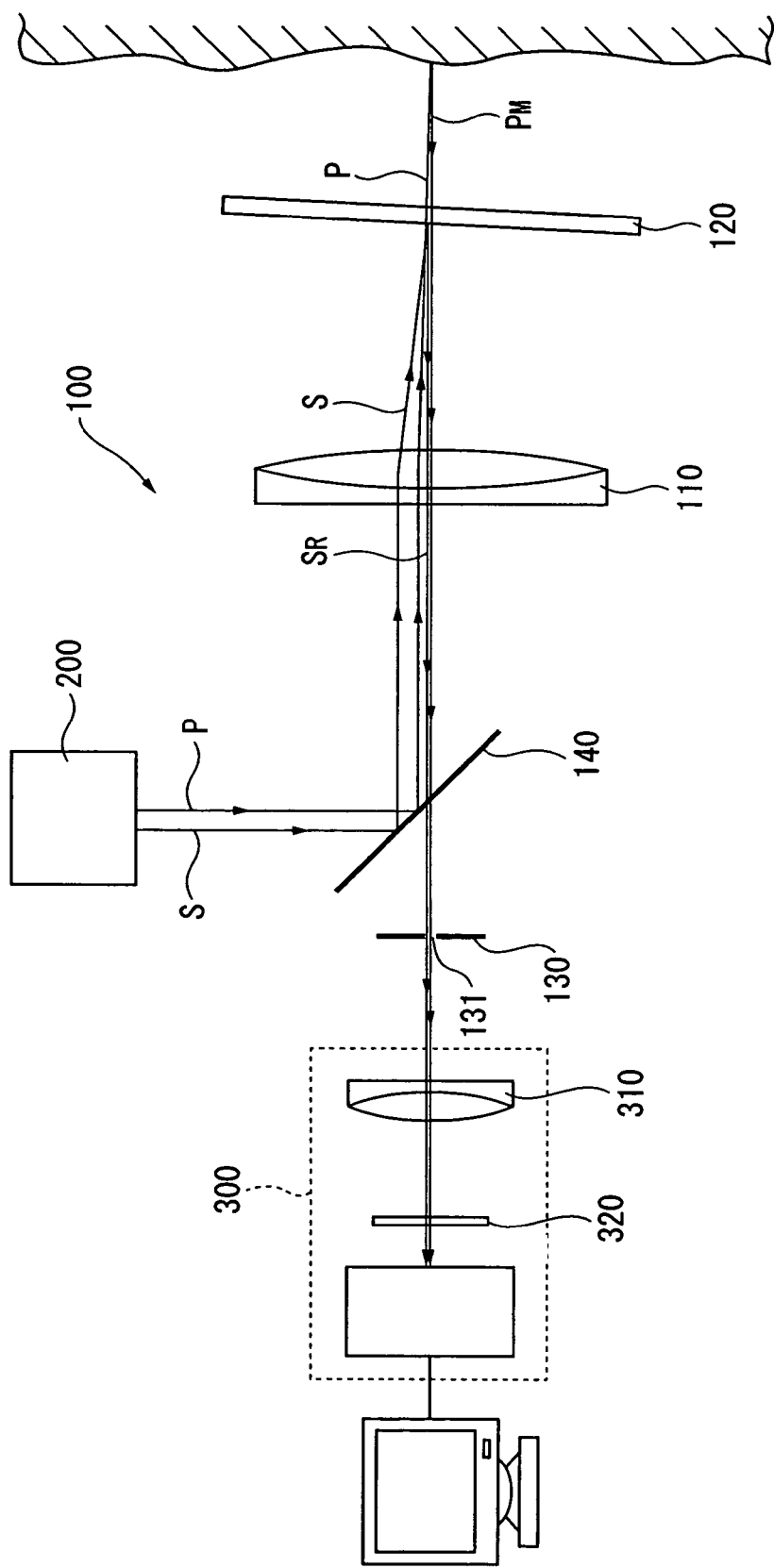
FIG. 1 illustrates a configuration of a phase shift interferometer according to a first embodiment of the present invention.

Embodiments of the present invention will be described below with reference to the attached drawings and numerals assigned to the respective elements in the drawings.

First Embodiment

A first embodiment of the phase shift interferometer of the present invention will be described below.

FIG. 1 illustrates an entire configuration of the first embodiment.

A phase shift interferometer 100 is a Fizeau-type interferometer having an illuminating optical system 200 that emits an S-wave (a first polarized light) and a P-wave (a second polarized light) having polarizing directions orthogonal to each other, a collimator lens 110 that converts the light from the illuminating optical system 200 into a parallel beam to be irradiated on a surface of a workpiece (a surface-to-be-measured), a reference half mirror 120 as a reference surface disposed between the collimator lens 110 and the workpiece at a predetermined tilting angle, a pinhole plate 130 provided with a pinhole 131 located at a focus position of the collimator lens 110 on the side opposite to the workpiece, a phase shift interference fringe acquiring section 300 that allows light beams passed through the pinhole 131 to interfere with each other in different phases to acquire interference fringes with different phases, and a half mirror 140 that reflects the light from the illuminating optical system 200 toward the surface of the workpiece and passes the light reflected both from the surface of the workpiece and the reference half mirror 120 toward the phase shift interference fringe acquiring section 300.

Figure 2:
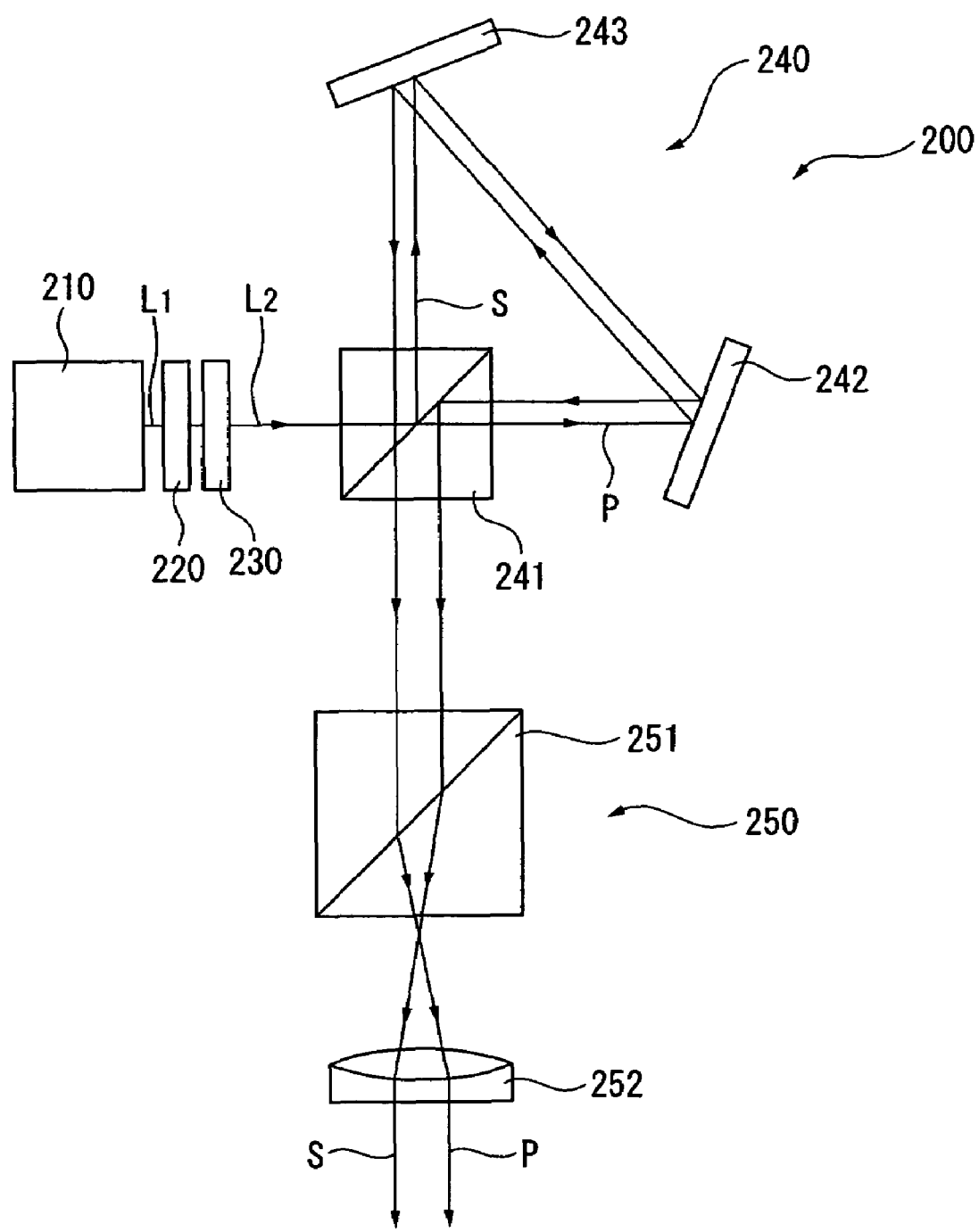
FIG. 2 illustrates a configuration of an illuminating optical system of the first embodiment.

A configuration of the illuminating optical system will be described with reference to FIG. 2.

The illuminating optical system 200 includes a laser light source 210, a polarizer 220 that converts the light from the laser light source 210 into a polarized light, a half wavelength plate 230, a beam splitter 240 that splits the light from the laser light source 210 into a P-wave and an S-wave, and a parallel beam generator 250 that converts the P-wave and the S-wave from the beam splitter 240 into parallel beams.

The beam splitter 240 includes a polarization beam splitter 241 and two reflecting mirrors 242, 243.

Incidentally, the polarization beam splitter 241 passes the P-wave but reflects the S-wave.

Described below is an optical path through which the light emitted from the laser light source 210 is split into the P-wave and S-wave by the polarization beam splitter 241 and the two reflecting mirrors 242 and 243, and converted into two light beams separated by a predetermined interval.

The light (L1) emitted from the laser light source 210 passes through the polarizer 220 so as to turn to a polarized light having a predetermined polarizing direction. Then, after its polarizing direction being rotated by a predetermined angle by the half wavelength plate 230, the light is incident (L2) on the polarization beam splitter 241. Among the light (L2) incident on the polarization beam splitter 241, the P-wave is passed through the polarization beam splitter 241 and the S-wave is reflected by the polarization beam splitter 241. The two reflecting mirrors 242 and 243 are so arranged that the light (the P-wave and the S-wave) from the polarization beam splitter 241 is reflected by the two reflecting mirrors 242 and 243 along a triangular path so that the light returns to the polarization beam splitter 241 after being reflected.

At the time when the P-wave passed through the polarization beam splitter 241 returns to the polarization beam splitter 241 after being reflected by the first reflecting mirror 242 and then by the second reflecting mirror 243, the position where the light returns to the polarization beam splitter 241 is deviated from the position where the light is incident on the polarization beam splitter 241 from the light source. Further, the P-wave from the second reflecting mirror 243 is passed through the polarization beam splitter 241 and then incident on the parallel beam generator 250.

Further, the S-wave reflected by the polarization beam splitter 241 returns to the polarization beam splitter 241 along a path opposite to that of the P-wave. In other words, the S-wave reflected by the polarization beam splitter 241 returns to the polarization beam splitter 241 after being reflected by the second reflecting mirror 243 and then by the first reflecting mirror 242.

At this time, the position where the light returns to the polarization beam splitter 241 from the first reflecting mirror 242 is deviated from the position where the light (L2) is incident on the polarization beam splitter 241 from the light source 210, and is at the side opposite to the P-wave side.

Further, the S-wave from the first reflecting mirror 242 is reflected by the polarization beam splitter 241 and then incident to the parallel beam generator 250.

In this manner, the P-wave passed through the polarization beam splitter 241 and the S-wave reflected by the polarization beam splitter 241 are reflected along the triangular path in directions opposite to each other so as to become two light beams separated by a predetermined interval.

The parallel beam generator 250 includes a Wollaston prism 251 and a lens 252. The P-wave and the S-wave from the polarization beam splitter 241 are incident on the Wollaston prism 251 as light beams parallel to each other, so that the P-wave and the S-wave are emitted from the Wollaston prism 251 at an emitting angle of about 5 degrees with respect to a straight path. The P-wave and the S-wave emitted from the Wollaston prism 251 are converged by passing through the lens 252 and emitted from the illuminating optical system 200 as diffused light beams.

Further, the lens 252 is so arranged that its focus position is located at a position where light beams emitted from the Wollaston prism 251 cross each other, so that the optical axis of the P-wave and the optical axis of the S-wave are paralleled to each other after passing through the lens 252.

Figure 3:
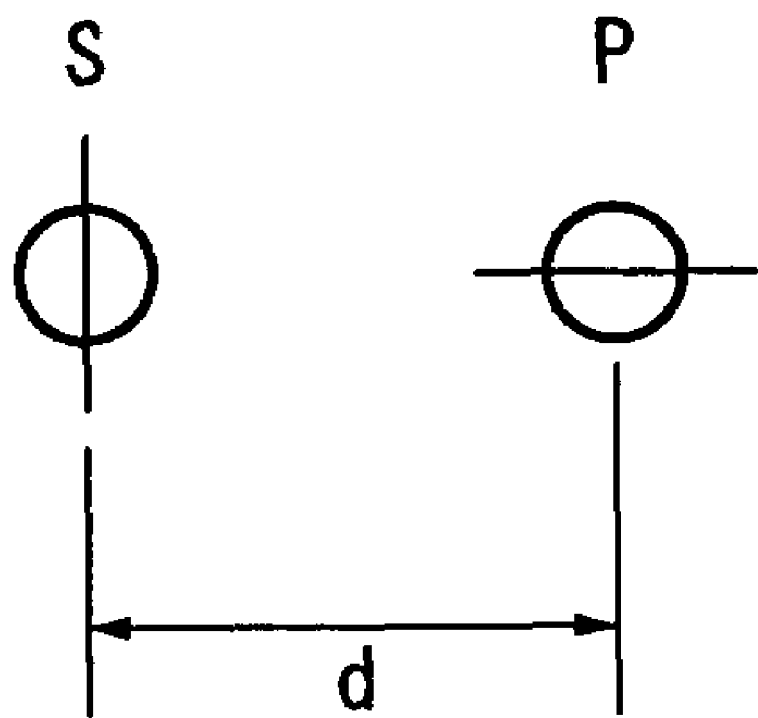
FIG. 3 illustrates a separated state of a P-wave and a S-wave emitted from the illuminating optical system.

With the illuminating optical system 200 having such an arrangement, as shown in FIG. 3, the P-wave and the S-wave are emitted in such a state that they are separated from each other by a predetermined interval (d).

Described below are optical paths through which the P-wave and the S-wave are irradiated on the reference half mirror 120 and the surface of the workpiece, and the lights respectively reflected by the reference half mirror 120 and the surface of the workpiece are passed through the pinhole 131.

First, the optical path of the P-wave emitted from the illuminating optical system 200 will be described with reference to FIG. 4.

Figure 4:
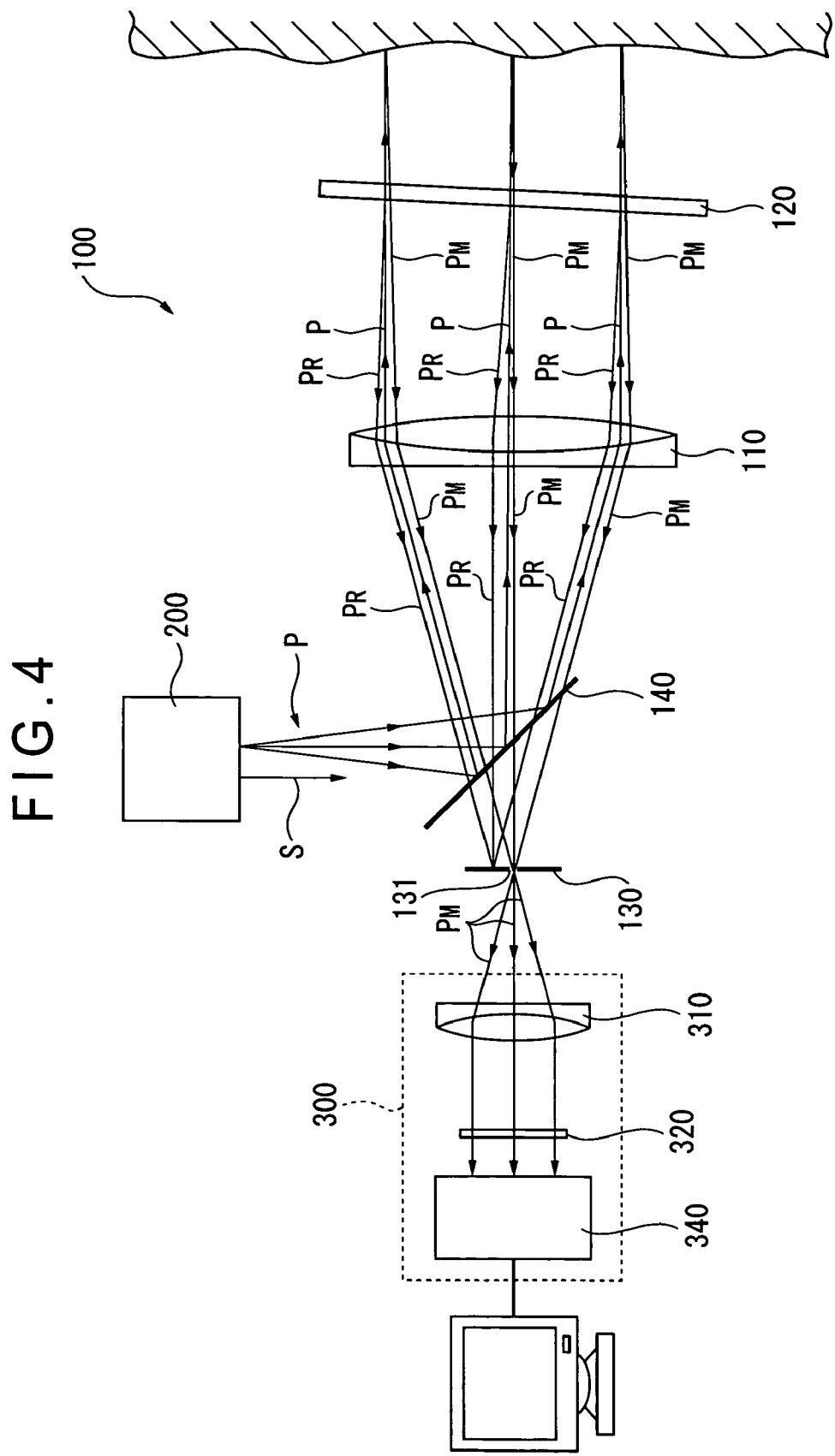
FIG. 4 illustrates the optical path of the P-wave of the first embodiment.

FIG. 4 illustrates the optical path of the P-wave.

The P-wave emitted from illuminating optical system 200 is reflected by the half mirror 140, then passed through the collimator lens 110, and then irradiated on the reference half mirror 120 and the surface of the workpiece.

When the P-wave reflected by the reference half mirror 120 is passed through the collimator lens 110, the position where the central axis of the P-wave is incident on the half mirror 140 is located in the optical axis of the collimator lens 110. Thus, the P-wave reflected by the half mirror 140 and passed through the collimator lens 110 becomes a parallel beam to be irradiated to the reference half mirror 120 and the surface of the workpiece.

Herein, a portion of the P-wave irradiated on the reference half mirror 120 is reflected by the reference half mirror 120.

The light reflected by the reference half mirror 120 is referred to as reference light (PR) of the P-wave.

Further, a portion of the P-wave irradiated on the reference half mirror 120 is passed through the reference half mirror 120, irradiated on the surface of the workpiece, and reflected by the surface of the workpiece.

The light reflected by the surface of the workpiece is referred to as object light (PM) of the P-wave.

Both the reference light (PR) of the P-wave reflected by the reference half mirror 120 and the object light (PM) of the P-wave reflected by the surface of the workpiece are directed toward the pinhole 131 from the collimator lens 110 after passing through the half mirror 140.

Since the reference half mirror 120 is tilted at a predetermined angle, the reference light (PR) of the P-wave is reflected from the reference half mirror 120 along a direction tilted at a predetermined angle with respect to the optical axis of the collimator lens 110. Thus, the position where the reference light (PR) of the P-wave is imaged by the collimator lens 110 is deviated from a focus position of the collimator lens 110. On the other hand, the object light (PM) of the P-wave reflected by the surface of the workpiece is imaged at the focus position of the collimator lens 110 after passing through the collimator lens 110.

Figure 5:
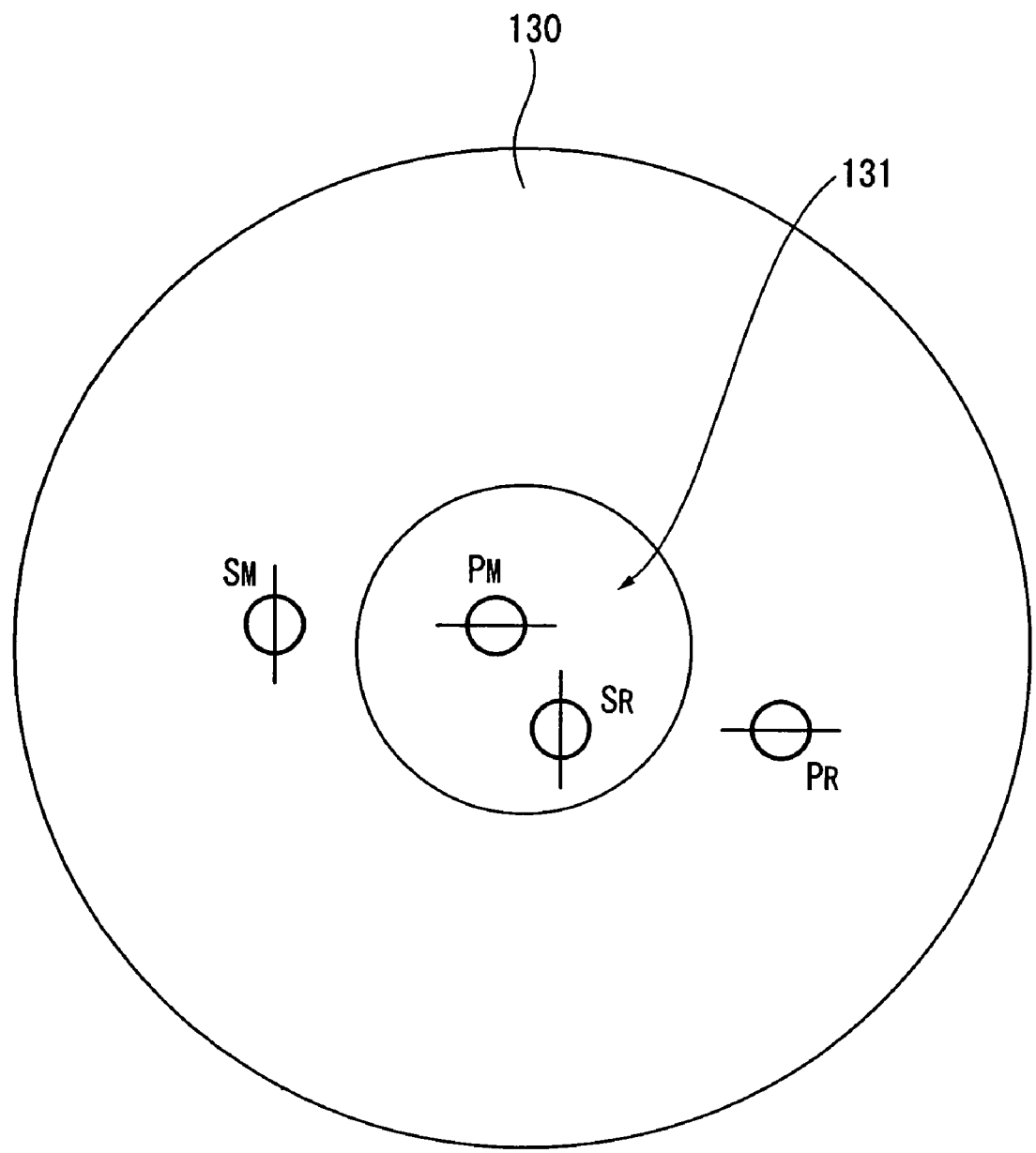
FIG. 5 illustrates a light passed through a pinhole and a light blocked by the pinhole plate.

Since the reference light (PR) of the P-wave passed through the collimator lens 110 is focused at a position deviated from the pinhole 131, the reference light (PR) will be blocked by the pinhole plate 130 instead of passing through the pinhole 131 (refer to FIG. 5).

On the other hand, since the object light (PM) of the P-wave passed through the collimator lens 110 is focused within the pinhole 131 (refer to FIG. 5), the object light (PM) will be directed toward the phase shift interference fringe acquiring section 300 after passing through the pinhole 131.

Next, the optical path of the S-wave emitted from the illuminating optical system 200 will be described below.

Figure 6:
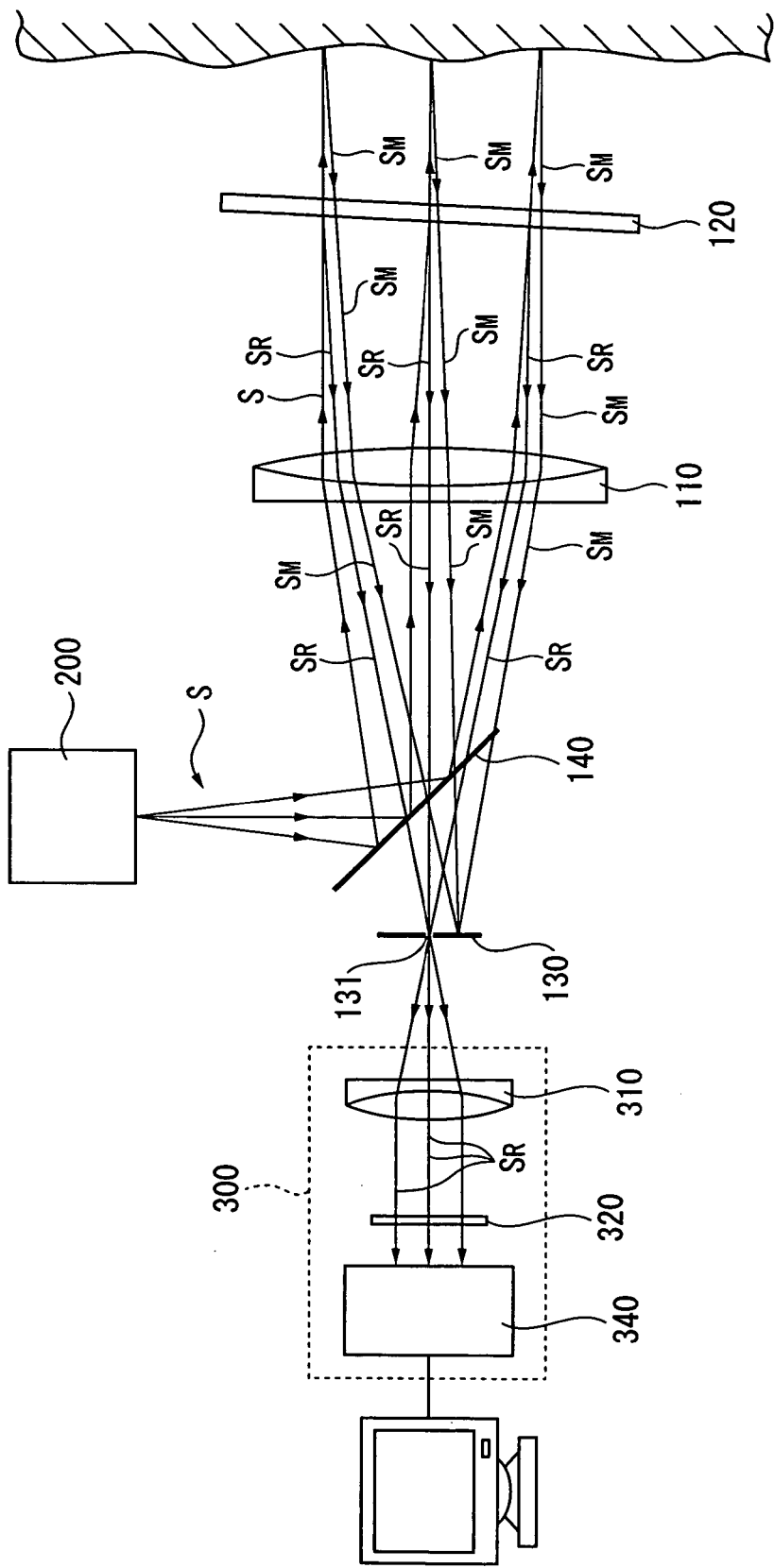
FIG. 6 illustrates the optical path of the S-wave of the first embodiment.

FIG. 6 illustrates the optical path of the S-wave.

The S-wave emitted from illuminating optical system 200 is reflected by the half mirror 140, then passed through the collimator lens 110, and then irradiated on the reference half mirror 120 and the surface of the workpiece. When the S-wave reflected by the half mirror 140 is passed through the collimator lens 110, the S-wave is separated from the P-wave by a predetermined interval, and the position where the central axis of the S-wave enters the half mirror 140 is deviated from a main axis of the collimator lens 110. Thus, the light reflected by the half mirror 140 and passed through the collimator lens 110 is irradiated on the reference half mirror 120 and on the surface of the workpiece at a predetermined tilting angle.

A portion of the S-wave irradiated on the reference half mirror 120 is reflected by the reference half mirror 120.

The light reflected by the reference half mirror 120 is referred to as reference light (SR) of the S-wave. Further, a portion of the S-wave irradiated on the reference half mirror 120 is passed through the reference half mirror 120, irradiated on the surface of the workpiece, and reflected by the surface of the workpiece. The light reflected by the surface of the workpiece is referred to as object light (SM) of the S-wave.

Both the reference light (SR) of the S-wave reflected by the reference half mirror 120 and the object light (SM) of the S-wave reflected by the surface of the workpiece are directed toward the pinhole 131 from the collimator lens 110 after passing through the half mirror 140.

Herein, the S-wave is incident on the reference half mirror 120 from the collimator lens 110 at a predetermined angle, and the reference half mirror 120 is tilted at a predetermined angle. At this time, the reference half mirror 120 is disposed at such an angle that it reflects the reference light (SR) of the S-wave substantially in parallel with the optical axis of the collimator lens 110.

In other words, the reference light (SR) of the S-wave is imaged at the focus position of the collimator lens 110 after passing through the collimator lens 110. Further, since the pinhole 131 is located at the focus position of the collimator lens 110, the reference light (SR) of the S-wave is passed through the pinhole 131 and directed toward the phase shift interference fringe acquiring section 300 (refer to FIG. 5).

On the other hand, since the S-wave irradiated on the surface of the workpiece after passing through the reference half mirror 120 from the collimator lens 110 is tilted at a predetermined angle with respect to the optical axis of collimator lens 110, the object light (SM) of the S-wave reflected by the surface of the workpiece is tilted at a predetermined angle with respect to the optical axis of the collimator lens 110. Thus, the object light (SM) of the S-wave is focused at a position deviated from the pinhole 131, and the object light (SM) will be blocked by the pinhole plate 130 instead of passing through the pinhole 131.

In other words, in the P-wave emitted from the illuminating optical system 200, the object light (PM) of the P-wave reflected by the surface of the workpiece is passed through the pinhole 131; and in the S-wave emitted from the illuminating optical system 200, the reference light (SR) of the S-wave reflected by the reference half mirror 120 is passed through the pinhole 131 (refer to FIG. 5).

Since the object light (PM) of the P-wave and the reference light (SR) of the S-wave have polarizing directions orthogonal to each other, as non-interfering light beams, the object light (PM) of the P-wave and the reference light (SR) of the S-wave will pass through the pinhole 131 without interfering with each other even if they pass through the pinhole 131 from the collimator lens 110 following a common optical path.

Figure 7:
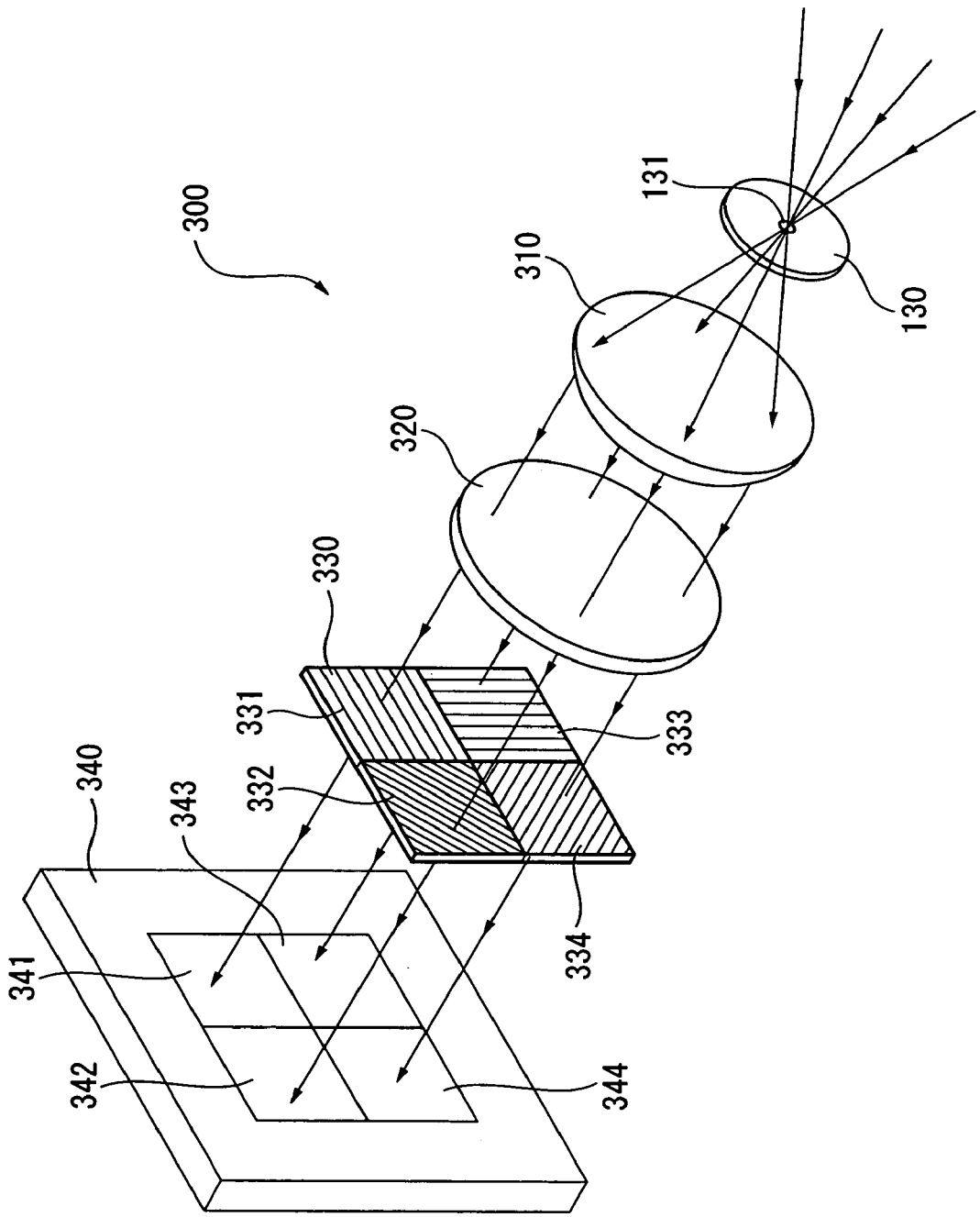
FIG. 7 illustrates a configuration of the phase shift interferometer of the first embodiment.

The phase shift interference fringe acquiring section 300 will be described below with reference to FIG. 7.

The phase shift interference fringe acquiring section 300 includes a lens 310, a quarter wavelength plate 320, a composite polarizer 330, and a composite CCD camera 340 as an imaging section.

Figure 8:
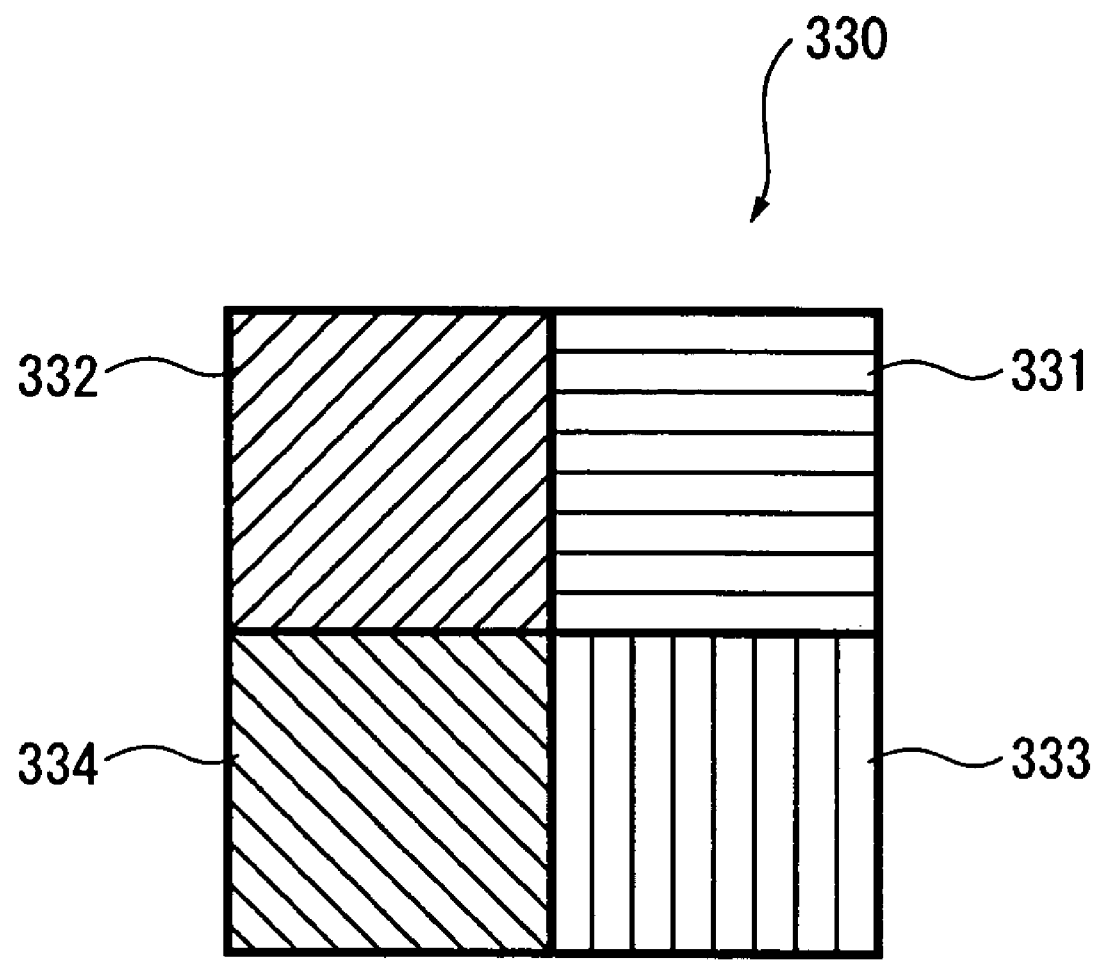
FIG. 8 illustrates a configuration of a composite polarizer of the first embodiment.

The lens 310 is so arranged that a focus position thereof is located at the pinhole 131. The quarter wavelength plate 320 converts the reference light of the S-wave and the object light of the P-wave incident from the pinhole 131 through the lens 310 into circularly polarized lights having rotating directions opposite to each other. As shown in FIG. 8, the composite polarizer 330 is formed by combining four polarizers 331 to 334, each having transmission axis angles different from each other, into one plate-like polarizer. By disposing the composite polarizer 330 in the optical path, the four portions of the beam are allowed to respectively pass through the polarizers 331 to 334 of the composite polarizer 330. The transmission axis angles of the polarizers 331 to 334 of the composite polarizer 330 are different from each other by 45°. Specifically, the transmission axis angles of the polarizers 331 to 334 are respectively 0°, 45°, 90°, and 135°. The composite CCD camera 340 includes four CCD cameras 341 to 344 corresponding to the polarizers 331 to 334 of the composite polarizer 330.

Described below is an optical path through which the light passed through the pinhole 131 (the reference light (SR) of the S-wave and the object light (PM) of the P-wave) is passed to the composite CCD camera 340 to be imaged.

The light passed through the pinhole 131 is passed through the lens 310 so as to turn to a parallel beam, and the parallel beam is incident on the quarter wavelength plate 320. By passing through the quarter wavelength plate 320, the object light (PM) of the P-wave and the reference light (SR) of the S-wave are converted into circularly polarized lights having rotating directions opposite to each other. The non-interfering light beams of the circularly polarized lights having rotating directions opposite to each other are incident on the composite polarizer 330, and the four portions of the beams are respectively passed through the polarizers 331 to 334 of the composite polarizer 330. After the non-interfering light beams have passed through the polarizers 331 to 334, the reference light (SR) of the S-wave and the object light (PM) of the P-wave included in the non-interfering light beams interfere with each other to form images of interference fringes. At this time, since the transmission axis angles of the polarizers 331 to 334 of the composite polarizer 330 are different from each other by 45°, four interference fringes having phases different from each other by 90° are formed.

Figure 9:
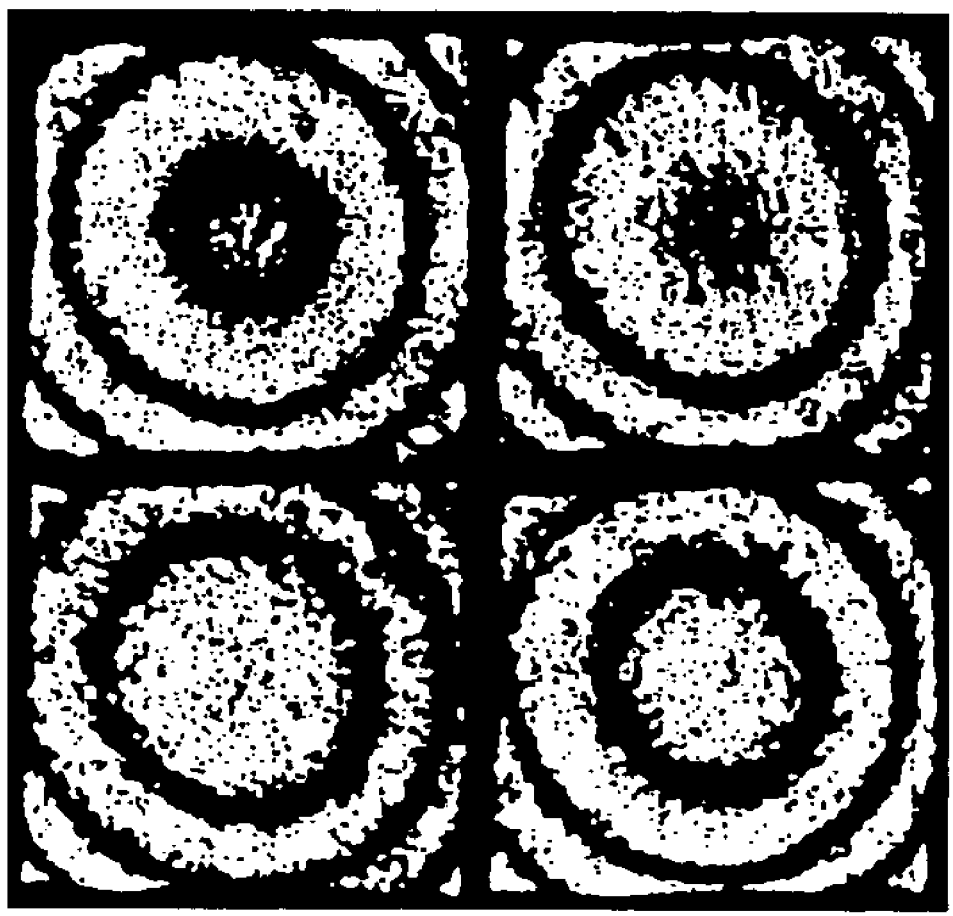
FIG. 9 illustrates an example of an interference fringe acquired by a phase shift interference fringe acquiring section of the first embodiment.

The images of the interference fringes are incident on the composite CCD camera 340 so as to be imaged by the CCD cameras 341 to 344 of the composite CCD camera 340. As shown in FIG. 9, the light beam is divided into four partitions, and interference fringes having phases different from each other are acquired in respective partitions.

Further, the images of the interference fringes are input to a predetermined analyzing section, and phase information of the surface of the workpiece can be acquired by comparing image strength in each point among the four interference fringes. Thus the surface shape of the workpiece can be measured.

Incidentally, when the interference fringes are acquired, it is preferred that the reference light (P-wave) and the object light (S-wave) have substantially the same strength. However, in the case where the surface of the workpiece and the reference half mirror 120 have different reflectivity, the object light (PM) of the P-wave reflected from the workpiece and the reference light (SR) of the S-wave reflected from the reference half mirror 120 will have different strength if the light irradiated on the workpiece and the light irradiated on the reference half mirror 120 have the same strength. Particularly, when the workpiece to be measured has low reflectivity, there is possibility that the object light (PM) of the P-wave is too weak to acquire desirable interference fringe.

In such a case, the half wavelength plate 230 of the illuminating optical system 200 can be rotated so that the angle of the main axis of the half wavelength plate 230 is adjusted. Namely, the polarizing direction of the polarized light is rotated by rotating the half wavelength plate 230 so that, for example, a transmitted light component (P-wave) formed during the splitting by the polarization beam splitter 241 is increased, and a reflected light component (S-wave) is decreased.

Thus, by adjusting the ratio of the P-wave to the S-wave formed during the splitting by the polarization beam splitter 241, the object light (PM) of the P-wave reflected by the workpiece and the reference light (SR) of the S-wave reflected by the reference half mirror 120 can be adjusted to have substantially the same strength, so that clear interference fringes can be acquired.

With the first embodiment having the above configuration, the following advantages can be achieved.

(1) Conventionally, in a Fizeau-type phase shift interferometer, a quarter wavelength plate was suggested to be used in order to convert an object light and a reference light into non-interfering light beams, but it was very difficult to obtain a wavelength plate with a wide opening so as to be adaptable to a wide light beam. However, with the present embodiment, since the P-wave and the S-wave are emitted from the illuminating optical system 200, it is not necessary to employ a wavelength plate to convert the object light and the reference light into non-interfering light beams. Thus, as a Fizeau-type interferometer for measuring the shape of a surface-to-be-measured, it is possible to achieve a phase shift interferometer 100 which allow the reference light (SR) of the S-wave and the object light (PM) of the P-wave to interfere with each other in different phases to simultaneously acquire a plurality of interference fringes with different phases.

(2) By making the P-wave and the S-wave emitted from the illuminating optical system 200 separated from each other by a predetermined interval, and further, by making the reference half mirror 120 tilted at a predetermined angle, the positions where the reference light (SR) of the S-wave, the reference light (PR) of the P-wave, the object light (SM) of the S-wave, and the object light (PM) of the P-wave are respectively imaged by the collimator lens 110 are deviated from each other. Further, only the reference light (SR) of the S-wave and only the object light (PM) of the P-wave are selected to be incident on the phase shift interference fringe acquiring section 300.

Since the light beams incident on the phase shift interference fringe acquiring section 300 are selected by the pinhole 131 as described above, the reference light (SR) of the S-wave and the object light (PM) of the P-wave can be incident on the phase shift interference fringe acquiring section 300 as non-interfering light beams, so that a plurality of interference fringes with different phases can be simultaneously acquired by making the reference light (SR) of the S-wave and the object light (PM) of the P-wave interfere with each other in different phases in the phase shift interference fringe acquiring section 300.

(3) Since the polarizing direction of the light (L2) incident on polarization beam splitter 241 can be adjusted by adjusting the angle of the main axis of the half wavelength plate 230 by rotating the half wavelength plate 230, the relative strength of the P-wave and the S-wave generated by splitting the light by the polarization beam splitter 241 can be adjusted. For example, when the workpiece to be measured has low reflectivity, there is possibility that the object light (PM) of the P-wave is too weak to acquire desirable interference fringes, however clear interference fringes can be acquired by adjusting the strengths of the P-wave and the S-wave so that the object light (PM) reflected by the workpiece and the reference light (SR) reflected by the reference half mirror 120 have substantially the same strength.

Modification 1

A modification 1 will be described below with reference to FIG. 10.

The modification 1 has the same basic configuration as the first embodiment but differs from the first embodiment in the structure of the illuminating optical system.

Figure 10:
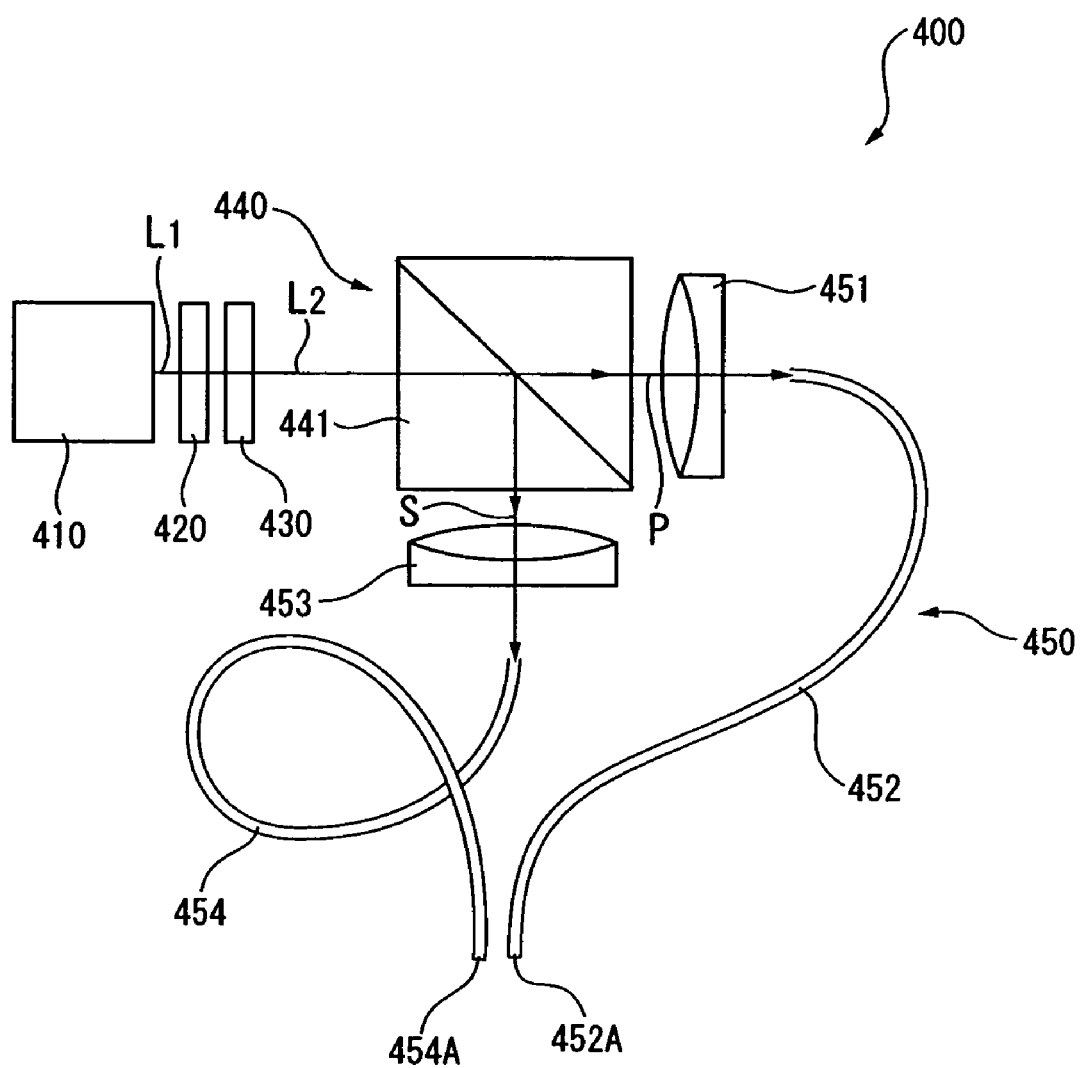
FIG. 10 illustrates a configuration of an illuminating optical system of a first modification.

As shown in FIG. 10, an illuminating optical system 400 includes a laser light source 410, a polarizer 420 that converts the light from the laser light source 410 into a polarized light, a half wavelength plate 430, a beam splitter 440 that splits the light from the laser light source 410 into a P-wave and an S-wave, and a parallel beam generator 450 that converts the P-wave and the S-wave from the beam splitter 440 into parallel beams.

Herein the beam splitter 440 is a polarization beam splitter 441, and the parallel beam generator 450 includes two lenses 451 and 453, and two optical fibers 452 and 454.

The light (L1) emitted from the laser light source 410 passes through the polarizer 420 so as to turn to a polarized light having a predetermined polarizing direction. Then, after its polarizing direction being rotated by a predetermined angle by the half wavelength plate 430, the light enters (L2) the polarization beam splitter 441, so that among the light entered into the polarization beam splitter 441, the P-wave is passed through the polarization beam splitter 441 and the S-wave is reflected by the polarization beam splitter 441. Further, the P-wave and the S-wave are respectively introduced into the optical fibers 452 and 454 through the lenses 451 and 453. End portions 452A, 454A of the optical fibers 452, 454 are disposed in parallel with each other at a predetermined interval. Thus the P-wave and the S-wave from the end portions 452A, 454A of the optical fibers 452, 454 are emitted in parallel with each other at a predetermined interval.

Modification 2

A modification 2 will be described below with reference to FIG. 11.

The modification 2 has the same basic configuration as the first embodiment but differs from the first embodiment in the structure of the illuminating optical system.

Figure 11:
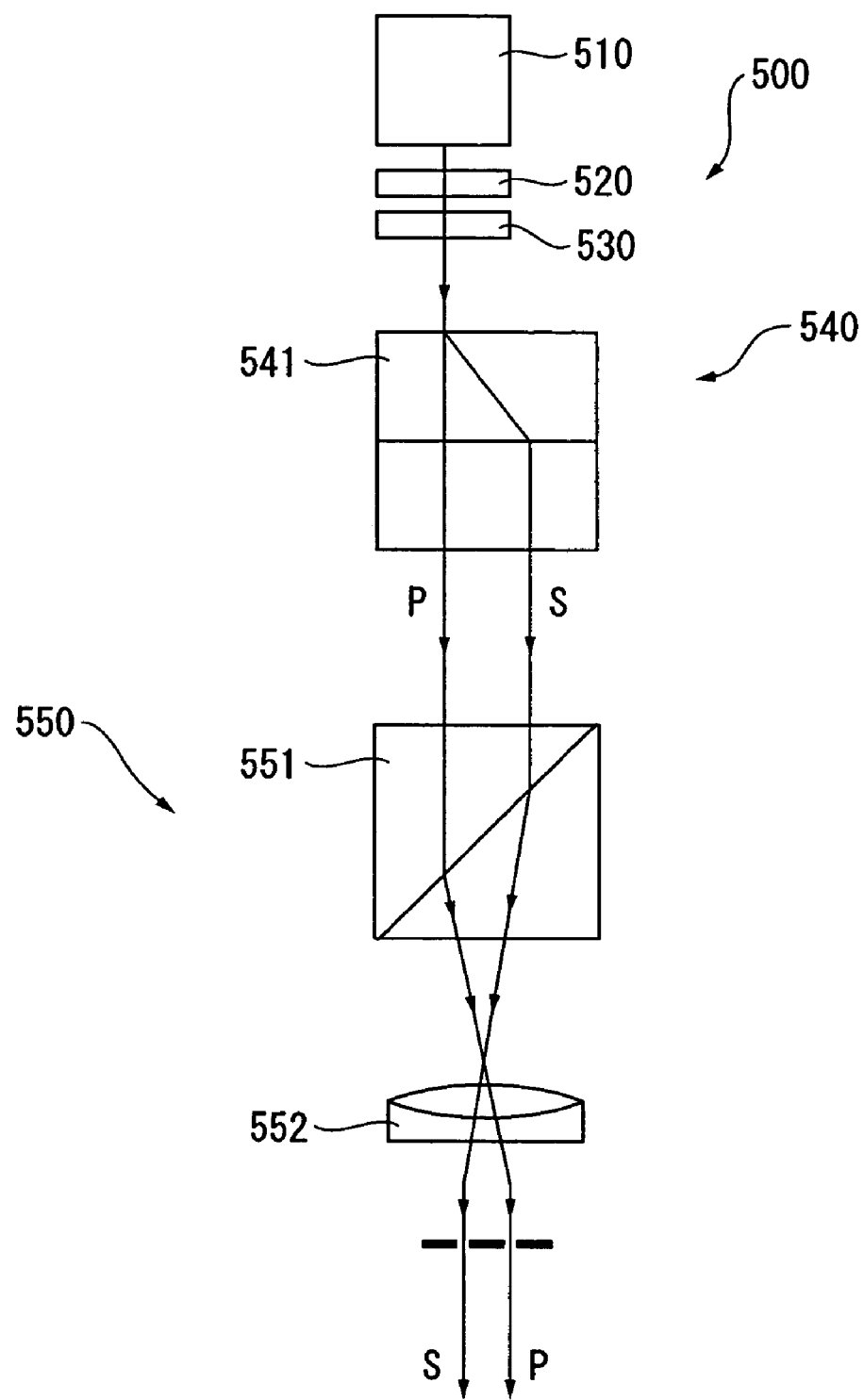
FIG. 11 illustrates a configuration of an illuminating optical system of a second modification.

As shown in FIG. 11, an illuminating optical system 500 includes a laser light source 510, a polarizer 520 that converts the light from the laser light source 510 into a polarized light, a half wavelength plate 530, a beam splitter 540 that splits the light from the laser light source 510 into a P-wave and an S-wave, and a parallel beam generator 550 that converts the P-wave and the S-wave from the beam splitter 540 into parallel beams.

Herein the beam splitter 540 is a Savart plate 541, and the parallel beam generator 550 includes a Wollaston prism 551 and a lens 552.

The light emitted from the laser light source 510 passes through the polarizer 520 so as to become a polarized light having a predetermined polarizing direction. Then, after its polarizing direction being rotated by a predetermined angle by the half wavelength plate 530, the light is incident on the Savart plate 541. By passing through the Savart plate 541, the light is converted into a P-wave and an S-wave having components orthogonal to each other and separated from each other by a predetermined interval.

Further, the P-wave and S-wave are emitted from the Savart plate 541 and incident to the Wollaston prism 551 in the state separated from each other by a predetermined interval, so that the P-wave and the S-wave are emitted from the Wollaston prism 551 at an emitting angle of about 5 degrees with respect to a straight path.

The P-wave and the S-wave emitted from the Wollaston prism 551 are converged by passing through the lens 552 and emitted from the illuminating optical system 500 as diffused light beams. Further, the lens 552 is so arranged that its focus position is located at a position where light beams emitted from the Wollaston prism 551 cross each other, so that the optical axis of the P-wave and the optical axis of the S-wave are paralleled to each other after passing through the lens 552.

Modification 3

A modification 3 will be described below with reference to FIG. 12.

The modification 3 has the same basic configuration as the first embodiment but differs from the first embodiment in the structure of the illuminating optical system.

Figure 12:
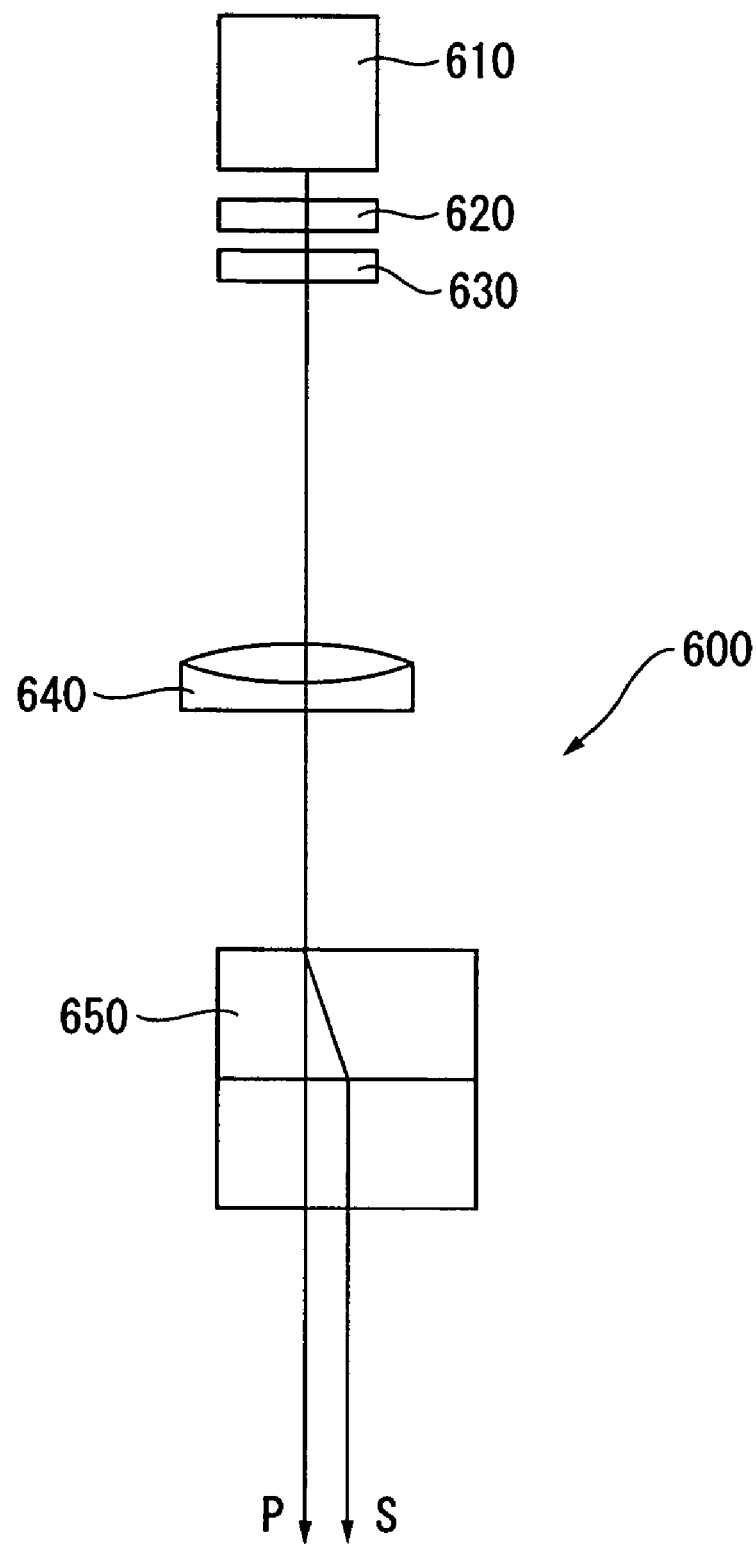
FIG. 12 illustrates a configuration of an illuminating optical system of a third modification.
Figure 13:
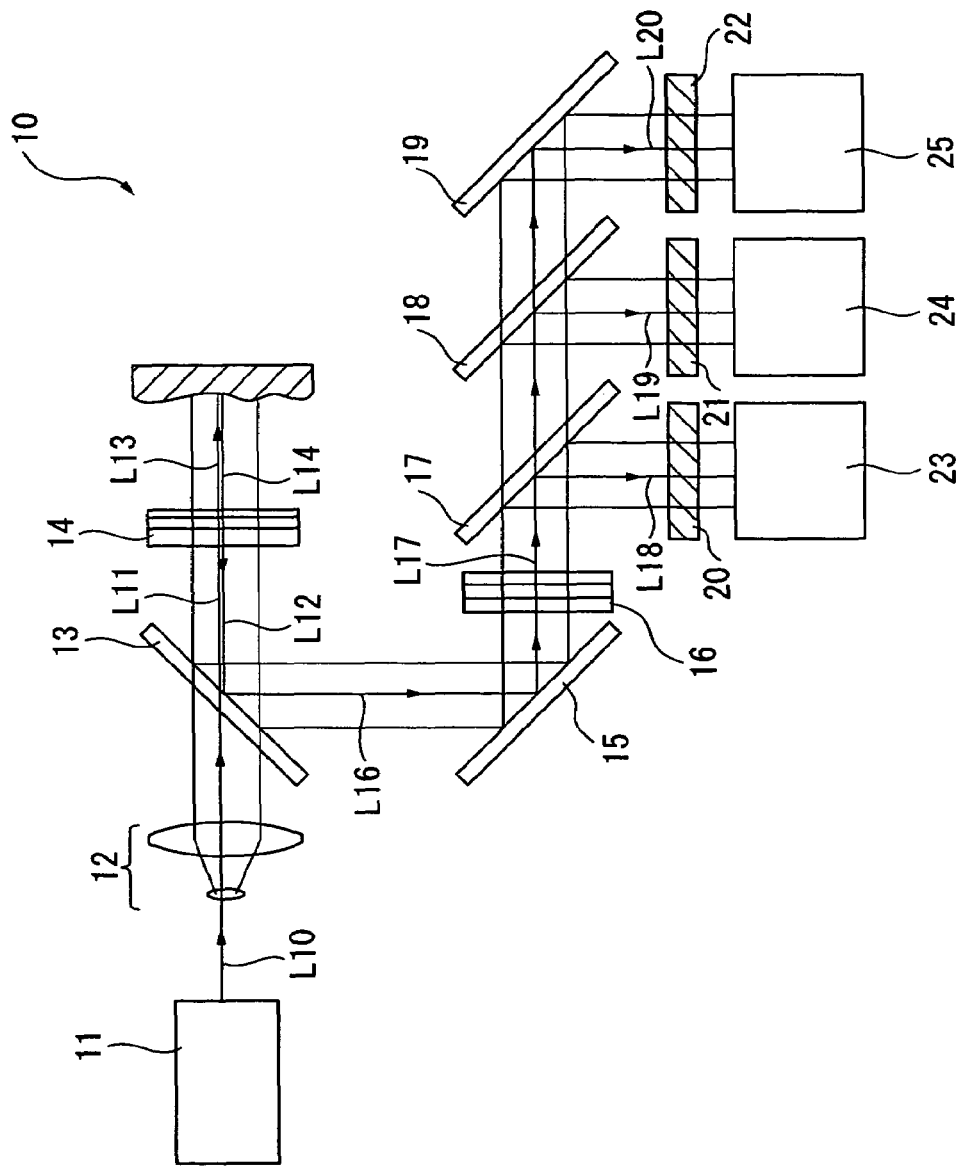
FIG. 13 illustrates a Fizeau-type phase shift interferometer as a prior art.

As shown in FIG. 12, the illuminating optical system 600 includes a laser light source 610, a polarizer 620 that converts the light from the laser light source 610 into a polarized light, a half wavelength plate 630, a lens 640, and a Savart plate 650.

The light emitted from the laser light source 610 passes through the polarizer 620 so as to turn to a polarized light having a predetermined polarizing direction. Then, after its polarizing direction being rotated by a predetermined angle by the half wavelength plate 630, the light is incident on the lens 640 so as to be converged by the lens 640, and then is incident on the Savart plate 650. By passing through the Savart plate 650, the light is converted into a P-wave and an S-wave having components orthogonal to each other and separated from each other by a predetermined interval. Further, the P-wave and S-wave are emitted from the Savart plate 650 in the state separated from each other by a predetermined interval.

Herein the Savart plate 650 constitutes a beam splitter and a parallel beam generator.

It is to be understood that the present invention is not limited to the embodiments described above, and various modifications and improvements can be made as long as the objects of the present invention can be achieved.

For example, the structure of the illuminating optical system is not limited to the structures described above but may be other as long as the light from the light source can be emitted in such a state that the light is split into a P-wave and an S-wave separated from each other by a predetermined interval.

Further, although the embodiments are described using an example where the lights emitted from the illuminating optical system are a P-wave and a S-wave which are linearly polarized lights, the lights also can be, for example, circularly polarized lights having rotating directions opposite to each other.

Although the phase shift interference fringe acquiring section is described using an example where the interference fringes with different phases are acquired by inserting the composite polarizer in the light beam to allow each portion of the light beams to pass through the respective polarizers, each having transmission axis angles different from each other, the interference fringes with different phases also can be acquired by splitting the non-interfering light beam passed through the pinhole into a plurality of light beams with plural half mirrors, prisms, or the like, and then making the respective light beams interfere with each other in different phases with a wavelength plate and a polarizer.

The priority application Number JP2005-211292 upon which this patent application is based is hereby incorporated by reference.

What is claimed is:

1. A phase shift interferometer, comprising:
an illuminating optical system for emitting a first polarized light and a second polarized light having polarizing directions orthogonal to each other or having rotating directions opposite to each other;
a collimator lens positioned in an optical path between the illuminating optical system and a surface-to-be-measured;
a reference half mirror positioned in the optical path between the collimator lens and the surface-to-be-measured for reflecting a portion of the first polarized light and the second polarized light while transmitting a portion of the first polarized light and the second polarized light toward the surface-to-be-measured;
a pinhole plate provided with a pinhole located at a focus position of the collimator lens on the side opposite to the surface-to-be-measured; and
a phase shift interference fringe acquiring section for making, in an object light reflected by the surface-to-be-measured and a reference light reflected by the reference half mirror, a portion of the object light and the reference light that have been passed through the pinhole interfere with each other in three or more different phases to acquire interference fringes with different phases;
wherein in the first polarized light, the reference light reflected by the reference half mirror is passed through the pinhole while the object light reflected by the surface-to-be-measured is blocked by the pinhole plate; and in the second polarized light, the object light reflected by the surface-to-be-measured is passed through the pinhole while the reference light reflected by the reference half mirror is blocked by the pinhole plate.

2. The phase shift interferometer according to claim 1, wherein
the illuminating optical system emits the first polarized light and the second polarized light at positions separated by a predetermined interval; and
the reference half mirror is tilted at a predetermined angle with respect to the optical axis of the collimator lens.

3. The phase shift interferometer according to claim 2, wherein the illuminating optical system emits the first polarized light at a point off the optical axis of the collimator lens while emits the second polarized light along the optical axis of the collimator lens.

4. The phase shift interferometer according to claim 1, wherein the phase shift interference fringe acquiring section comprises:

a quarter wavelength plate positioned in the optical path of the light passed through the pinhole; and three or more polarizers positioned in the optical path and having transmission axis angles different from each other.

5. The phase shift interferometer according to claim 1, wherein the illuminating optical system has a laser light source, a polarizer for converting the light from the laser light source into the polarized lights, a half wavelength plate, and a beam splitter for splitting the light from the laser light source into the first polarized light and the second polarized light having the polarizing directions orthogonal to each other, and the main axis angle of the half wavelength plate can be adjusted relative to the main axis angle of the beam splitter by rotating the half wavelength plate.

* * * * *